US007257487B2

(12) United States Patent
Tran

(10) Patent No.: US 7,257,487 B2
(45) Date of Patent: Aug. 14, 2007

(54) HYBRID AIR COLLISION AVOIDANCE SYSTEM

(75) Inventor: My Tran, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 222 days.

(21) Appl. No.: 11/337,212

(22) Filed: Jan. 20, 2006

(65) Prior Publication Data

US 2006/0287827 A1 Dec. 21, 2006

Related U.S. Application Data

(63) Continuation-in-part of application No. 11/019,781, filed on Dec. 21, 2004, which is a continuation-in-part of application No. 10/446,526, filed on May 27, 2003, now Pat. No. 6,873,269.

(51) Int. Cl.
*G06F 17/10* (2006.01)

(52) U.S. Cl. ...................... 701/301; 340/961; 340/963; 340/945; 701/14; 701/120

(58) Field of Classification Search ................ 340/945, 340/961, 963; 701/14, 120, 301
See application file for complete search history.

(56) References Cited

U.S. PATENT DOCUMENTS

| | | | | |
|---|---|---|---|---|
| 4,916,448 | A * | 4/1990 | Thor | 340/970 |
| 5,892,462 | A * | 4/1999 | Tran | 340/961 |
| 6,182,005 | B1 | 1/2001 | Pilliey et al. | |
| 6,262,697 | B1 | 7/2001 | Stephenson | |
| 6,480,120 | B1 * | 11/2002 | Meunier | 340/970 |
| 6,531,978 | B2 | 3/2003 | Tran | |
| 6,584,383 | B2 | 6/2003 | Pippenger | |
| 6,646,588 | B2 | 11/2003 | Tran | |
| 6,873,269 | B2 * | 3/2005 | Tran | 340/961 |
| 2001/0013836 | A1 * | 8/2001 | Cowie | 340/961 |
| 2004/0239529 | A1 * | 12/2004 | Tran | 340/961 |

FOREIGN PATENT DOCUMENTS

| | | |
|---|---|---|
| GB | 2 367 965 | 4/2002 |
| WO | WO 00/39775 A | 7/2000 |

* cited by examiner

*Primary Examiner*—Jeffery Hofsass
*Assistant Examiner*—Edny Labbees
(74) *Attorney, Agent, or Firm*—McDonnell Boehnen Hulbert & Berghoff LLP

(57) ABSTRACT

A hybrid air collision avoidance system (HACAS) is an air collision avoidance system with extended existing air avoidance capabilities and incorporated with new hybrid capabilities to perform hybrid air collision prediction and hybrid air collision avoidance. This system works in collaboration with two other systems, hybrid ground collision avoidance system, and obstacle avoidance dispatcher and resolver module to form a bi-directional feedback network for processing and exchanging of verification and validation collision avoiding data. With the embedded hybrid prediction and avoidance processing capabilities, the system not only can refine air collision avoidance solution to eliminate any induced ground collision situation, but also provide verification for ground collision avoidance resolution in the air domain; and subsequent validate the final avoidance solution.

17 Claims, 12 Drawing Sheets

HYBRID AIR COLLISION AVOIDANCE SYSTEM

CROSS-REFERENCE TO RELATED APPLICATIONS

This application is a continuation-in-part application of U.S. patent application Ser. No. 11/019,781, entitled “HYBRID GROUND COLLISION AVOIDANCE SYSTEM”, filed on Dec. 21, 2004, which is a continuation-in-part application of applicaton Ser. No. 10/446,526 filed May 5, 2003, U.S. Pat. No. 6,873,269, entitled “EMBEDDED FREE FLIGHT OBSTACLE AVOIDANCE SYSTEM”, issued on Mar. 29, 2005, the teachings of which are incorporated herein by reference.

BACKGROUND OF THE INVENTION

1. Field of the Invention (Technical Field)

The present invention relates generally to the field of avionics for hybrid air collision avoidance systems to provide a complete coverage for air collision avoidance situations and validate a ground collision resolution for an induced air collision situation. More specifically, the present invention relates to a hybridized dual domain handler avoidance system for providing instantaneous real-time air collision avoidance that will have a dual domain of air and ground compatibility. The invention provides the capabilities for automatic air collision avoidance re-planning with the aid of feedback data generated by the hybrid ground collision avoidance system and verification and validation of the air collision avoidance condition for a ground collision avoidance solution.

2. Background Art

An aircraft equipped with an embedded hybrid air collision avoidance system (HACAS) has the capabilities to uniquely avoid an air collision situation without the implication of inducing a ground collision. These capabilities are achieved by incorporating a dispatcher and collision resolver module. This module provides filtering of collision solution data, evaluating, and routing feedback data resulting from cross-domain verification in hybrid modules. By inserting hybrid processing capabilities, the hybrid ground collision avoidance module can predict if the solution produced by the hybrid air collision avoidance module will have ground clearance and similarly, the hybrid air collision module can also predict if the solution produced by the hybrid ground collision module will not mis-guide the aircraft to an unsafe airspace.

The development of an effective airborne obstacle collision avoidance system (CAS) has been the goal of the aviation community for many years. Airborne obstacle collision avoidance systems provide protection from collisions with ground and other aircraft. As is well appreciated in the aviation industry, avoiding collisions with ground and other aircraft is a very important endeavor. Furthermore, collision avoidance is a problem for both military and commercial aircraft alike. Therefore, to promote the safety of air travel, systems that avoid collision with other aircraft and terrain are highly desirable.

A prior art midair collision avoidance system is described in U.S. Pat. No. 6,262,697, to Tran, entitled Midair Collision Avoidance System, which uses a flight path angle, closure range, and closure rate with an intruder aircraft to determine whether an midair collision condition exists. The resulting solution is determined from prediction calculations and provides warnings and appropriate generated maneuvers to avoid an air collision. This solution is applied solely to the intruder aircraft in the proximity air space information without taking the potential terrain condition induced by the air avoidance maneuver into consideration. Without the feedback and validation of the solution from a ground collision coverage domain, the air avoidance solution in many instances does not have a complete free clearance for obstacle avoidance.

SUMMARY OF THE INVENTION (DISCLOSURE OF THE INVENTION)

The present invention is a hybrid air collision avoidance system that preferably is an embedded system in an integrated mission management system (IMMS). The system is one of three main engines of an obstacle avoidance system. Each engine is designed and partitioned as a module. The obstacle avoidance management module continuously monitors the status of ground collision conditions and air collision conditions and the solutions generated by the two indicated engines, as described in U.S. patent application Ser. No. 10/446,526, now U.S. Pat. No. 6,873,269, entitled “EMBEDDED FREE FLIGHT OBSTACLE AVOIDANCE SYSTEM”. This module also serves as a filtering medium and a conduit for passing a selective collision resolution from one engine to another engine to allow a continuous evaluation and providing feedback about an “induced” collision condition on the indicated solution. If an “induced” collision is determined, the information from the evaluation is routed back to the originated solution module for re-planning to generate a more suitable avoidance solution to a complex obstacle situation. When there is no potential conflict with the provided solution, the obstacle management module will process the obstacle solution package along with the original tag to generate specific guidance data, and can include an obstacle avoidance situation display, and a synthesized audio message being specific to the situation to warn the flight crew. The second component is a hybrid ground collision avoidance engine, as described in U.S. patent application Ser. No. 11/019,781, entitled “HYBRID GROUND COLLISION AVOIDANCE SYSTEM”. This engine takes into account the global air traffic management (GATM) information, terrain data, air data, radar altitude, and the check data contained in the air collision verification data to determine if there is a conflict found in the second engine in order to predict and generate a suitable solution for ground and specific air avoidance solutions. The third component is a hybrid air collision avoidance module to predict and generate a suitable solution for air and specific ground avoidance solutions, which is described in this disclosure.

The present invention processes navigation data, terrain data, air data and radar altitude, digitized data link data, along with a hybrid avoidance solution generated by the Hybrid Ground Collision Avoidance System to determine if there is a conflict in the air domain. If there is a conflict, the specific information of location, avoidance maneuver path and time markers will be routed to the Hybrid Ground Collision Avoidance System (HGCAS). This information will allow the HGCAS to verify the solution compatibility with the operating ground situation. If the feedback data identifies a positive incompatibility condition found in the ground solution, then the system will apply a re-planning process with the specific feedback information to refine the avoidance solution. If the revised solution is again verified, it takes the feedback data of predicting ground collision and provides a cross-feed of collision and avoidance data produced by the two avoidance modules by implanting unique air avoidance capabilities in the hybrid terrain collision avoidance engine and unique ground avoidance capabilities in the hybrid air collision avoidance module, along with the arbitration and controlling capability in the obstacle avoidance management module, which results in producing an obstacle avoidance solution.

It is an object of the present invention to provide air collision avoidance control guidance that is compatible with instantaneous operating air space and localized terrain and feature situations, and unambiguous warnings to any flight crew operating an aircraft. The prior art control guidance and warnings produced from a single domain system, in some instances, can create ambiguity and uncertainty to the operation of the flight crew.

It is an object of the present invention to provide a suggestive modification to the solution of the hybrid ground collision avoidance system to be compatible with the air traffic situation.

It is also an object of the present invention to provide a hybrid air collision avoidance system that is capable of verifying and validating ground collision avoidance solution for induced air collision condition.

It is a further object of the present invention to provide a hybrid air collision avoidance system, which is capable of generating an air collision avoidance solution by re-planning with the aiding of feedback data from a hybrid ground collision avoidance system.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (Best Modes For Carrying Out The Invention)

Figure 1:
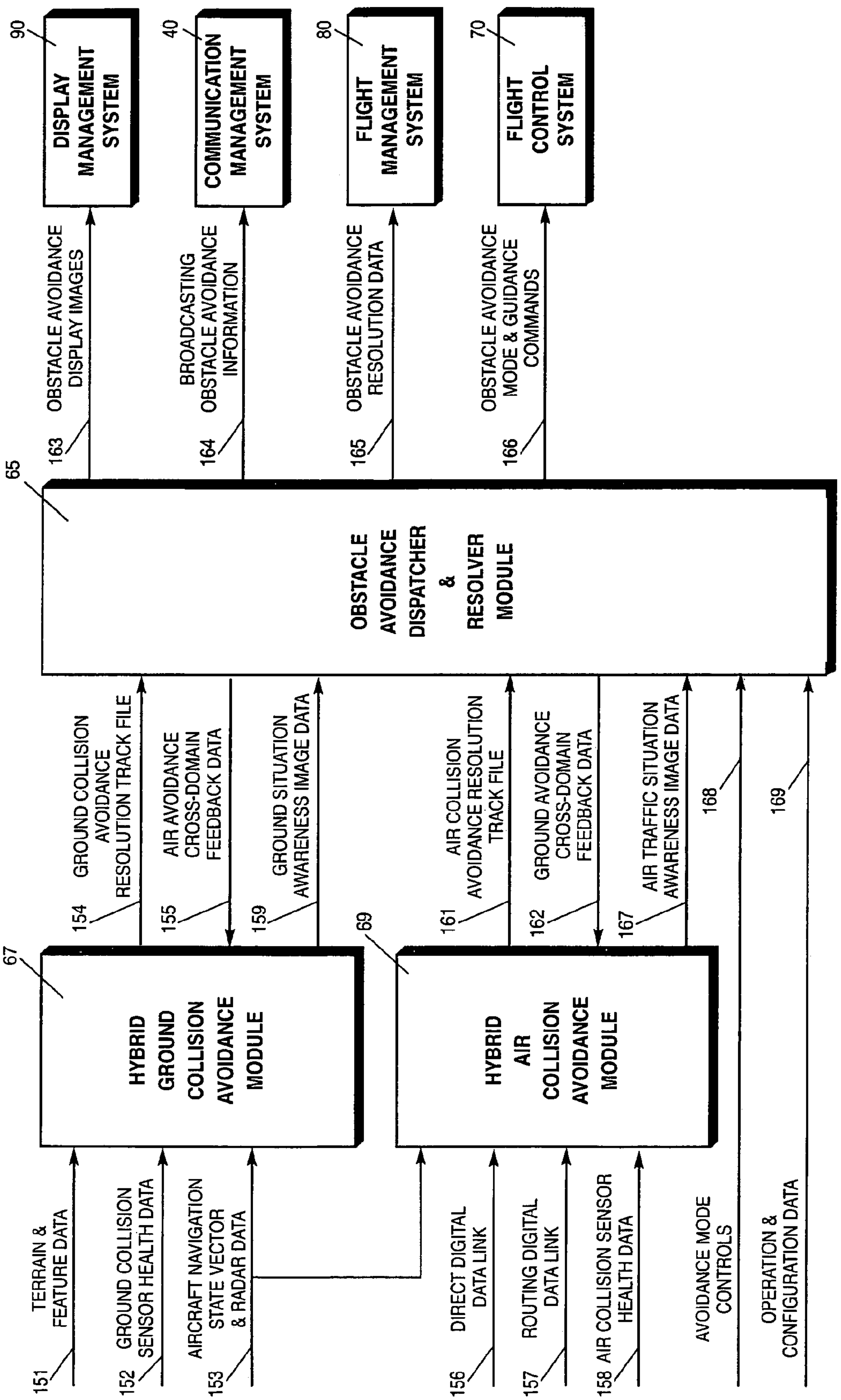
FIG. 1 is a diagram showing the modular structure of the preferred hybrid air collision avoidance system with three collaborative system modules in accordance with the present invention.

Referring to FIG. 1, there is shown a modularized structural diagram of three-hybrid embedded modules that make up the preferred free flight obstacle avoidance system. Each module provides a set of unique functional capabilities enabling collaborative operations between the three modules. Hybrid Ground Collision Avoidance Module (HGCAM) 67 operates with three different modes, the Standby mode, the Hybrid Ground Collision Prediction (HGCP) mode and hybrid Ground Collision Avoidance (HGCA) mode. To predict ground collision conditions on a continuous basis, HGCAM 67 relies on terrain and features data 151, ground collision sensor health data 152, and aircraft navigation state vector and radar data 153. In the HGCP mode, HGCAM 67 uses the air avoidance resolution information contained in air avoidance cross-domain feedback data 155 with the indicative inputs to determine terrain clearance conditions for an indicated air avoidance solution. HACAM 69 also operates in three modes, the Standby mode, the Hybrid Air Collision Prediction (HACP) mode, and the Hybrid Air Collision Avoidance (HACA) mode. To predict an air collision condition on a continuous basis, HACAM 67 relies on the data contained in direct digital data link 156, routing digital data link 157, air collision sensor health data 158, and aircraft navigation state vector and radar data 153. In the HACP mode, HACAM 69 uses the ground avoidance solution information contained in the ground avoidance cross-domain feedback data 162 along with the indicative inputs to determine air clearance conditions for an indicated ground avoidance solution. To achieve operational compatibility for the final obstacle avoidance solution in the dual-domains of ground and air traffic, obstacle avoidance dispatcher and resolver module (OADRM) 65 will operate based on the controls and data from avoidance mode controls 168 and operation and configuration data 169 in dispatching an avoidance solution along with the supportive data produced from one hybrid module and consumed by another hybrid module. The routing information will enable the process of cross-domain verification and validation for an avoidance solution. If an avoidance solution results in an "induced" collision condition in the verifying phase, then OADRM 65 will correlate and provide the originator module with verification feedback, air avoidance cross-domain feedback data 155 for HGCAM 67 and ground avoidance cross-domain feedback data 162 for HACAM 67. If an "induced" condition is determined, the detailed information of the "induced" condition is included in the feedback data. The originator module will use the feedback data to generate a more applicable solution, comprising either modifying the original solution or generating a new solution. OADRM 65 monitors the data contained in ground collision avoidance resolution track file 154 to determine if a predicted ground collision condition exists. If the condition exists, OADRM 65 sends a request along with the data extracted from ground collision avoidance track file 154 to HACAM 69 to perform verification for an air traffic situation. After determining an air traffic situation for an indicated ground collision avoidance solution, HACAM 69 provides feedback information via air collision avoidance resolution track file 161 to OADRM 65. This module will process the feedback data and package the data to be routed back to HGCAM 67. Similarly, OADRM 65 checks for compatibility indicators in the ground collision avoidance resolution track file 154 for an air traffic avoidance resolution and then determines appropriate data to send back to HACAM 69 through ground avoidance cross-domain feedback data 162. If compatibility is obtained, OADRM 65 will overlay the obstacle data with the map data and the air traffic data 167 to provide obstacle avoidance display images 163. The display data is then sent to display management system 90 for image rendering. The obstacle resolution along with the aircraft dynamics navigation vector are packed in broadcasted obstacle avoidance information 164 and sent to communication management system 40. OADRM 65 sets the state of the obstacle avoidance mode and feeds the control target through the obstacle guidance control laws to generate proper mode and guidance commands 166 to flight control system 70. Filtered obstacle avoidance resolution data 165 is sent to flight management system 80 for flight plan updates and informs air traffic management of impending changes to the active flight plan. Similarly, OADRM 65 monitors the data contained in air collision avoidance resolution track file 161 to determine if a predicted air collision condition exists. If the condition exists, OADRM 65 extracts the information from air collision avoidance resolution track file 161 and sends it to HGCAM 67 to perform verification via air avoidance cross-domain feedback data 155. After verifying for the comparability of the air solution in the ground domain, HGCAM 67 transmits the feedback information for the air resolution to ground collision avoidance resolution track file 154. OADRM 65 checks for air compatibility provided for the ground solution in air collision avoidance track file 161 and sends back this information to HGCAM 67 through air avoidance cross-domain feedback data 155. If compatibility is obtained, OADRM 65 will overlay the obstacle data with ground situation awareness image data 159 and send this image data to display management system 90. In addition, OADRM 65 generates obstacle avoidance mode and guidance commands 166 for flight control system 70 and sends the re-planned flight path to flight management system 80 for flight plan updates and fuel and time performance predictions. OADRM 65 also has the capability to filter, select, and tag the data provided by hybrid modules 67 and 69, prior to routing the packaged data for verification and validation in a different domain.

Figure 2:
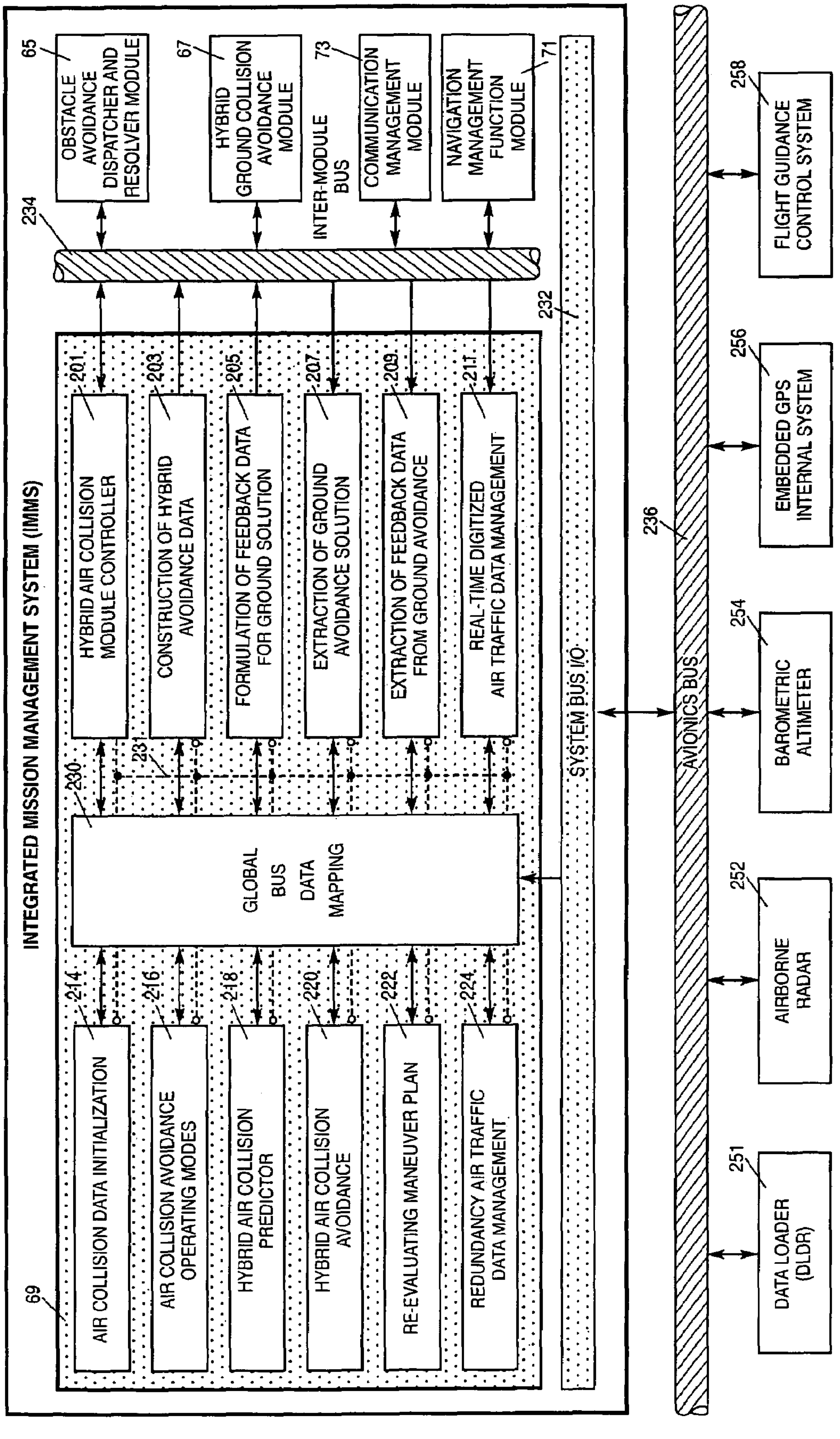
FIG. 2 is a functional block diagram showing system components and the interfaces between the Hybrid Air Collision Avoidance System and other avionics systems, the Obstacle Avoidance Dispatcher and Resolver system, and Hybrid Ground Collision Avoidance System in accordance with the present invention.

Referring to FIG. 2, there is shown a functional block diagram of HACAS 69 from FIG. 1. HACAS 69 preferably has a bi-directional communication means with Obstacle Avoidance Dispatcher and Resolver Module (OADRM) 65 and Navigation Management Function Module 71 through an intra-module bus 234. Global Bus Data Mapping 230 handles data transferred between internal components of HACAS 69. External communication with other avionics systems includes Data Loader (DLDR) 251, Radar Altimeter 252, Barometric Altimeter 254, Embedded Global Positioning and Inertial System (EGI) 256, and Flight Guidance Control System 258. Communication is controlled and scheduled for transmitting and receiving by System Bus Input and Output Controller 232 on avionics bus 236. HACAS 69 is built with a set of components designed to perform the hybrid air collision prediction function and the hybrid air collision avoidance function. The first component is a hybrid air collision avoidance module controller 201. This component determines timing and a processing sequence of all components contained in this module and activates controls through control scheduler 231. Air collision avoidance operating modes component 216 periodically evaluates system conditions to determine the active mode and state for the module. After completion of system power-up test, air collision data initialization component 214 performs initialization for all working data buffers and sets the control signals to safe states. Hybrid air collision predictor component 218 determines an air collision condition based on closure time and closure rate provided by flight path interception computations with instantaneous projection of inertial flight paths of the host aircraft and intruder aircraft. If extraction of ground traffic avoidance resolution component 207 determines that there is a request to verify air domain compatibility for a ground collision avoidance resolution, then this component will unpack and convert the provided data to a specific format needed by hybrid air collision predictor 218. With the availability of the formatted ground collision avoidance resolution data, hybrid air collision predictor 218 provides an evaluation of a ground collision avoidance solution with the intermediate air traffic situation to determine if an induced air collision condition exists. To maintain a currency of air traffic redundancy, air traffic data management component 224 continuously filters and updates the data file contained tracking intruder aircraft data. The current intruder tracking file is an important input to the processing of two components, hybrid air collision predictor 218 and hybrid air collision avoidance 220. The re-evaluating maneuver plan component 222 re-establishes the process of collision avoidance, which will be used by hybrid air collision avoidance 220 in generating a new air avoidance solution. If there is an indication of an induced ground collision in the feedback data, hybrid air collision avoidance component 220 uses the re-evaluating maneuver plan to generate a new solution that will be compatible with the ground domain and have the induced ground collision condition to be removed. To resolve an induced ground collision situation, the extraction of feedback data from ground avoidance component 209 unpacks the data and converts them to the format to be expected by hybrid air collision avoidance component 220. If there is an air collision condition and hybrid air collision avoidance component 220 completes the generation of the air collision avoidance solution, the construction of hybrid avoidance data component 203 takes the output data produced by hybrid air collision predictor 218 and hybrid air collision avoidance component 220 to form a hybrid data package of an air collision avoidance solution. This package is sent to OADRM 65 and subsequently, the data in this package is processed by HGCAS 67 to verify and validate for ground domain compatibility. For the feedback of a ground collision avoidance solution, formulation of feedback data for ground solution 205 will collect verification data produced in air collision avoidance operating modes component 216 along with the suggested solution produced by hybrid air collision avoidance component 220 into a hybrid data package. The data is then transmitted to OADRM 65. Extraction of feedback data from ground avoidance solution component 209 processes the feedback data to evaluate if the generated air traffic collision avoidance resolution is compatible with the ground domain. If there is an induced ground collision condition, the re-evaluating maneuver plan for removing induced ground collision component 222 takes into consideration of the ground collision information, such as a predicted ground collision location and time along with suggestive maneuver flight path to generate a new air traffic collision avoidance resolution. Redundancy data management component 224 selects the appropriate sensor data to be used by other components to determine a mode of operation, air collision prediction, and air collision avoidance resolution generation. The real-time digitized air traffic data management component 211 processes the air traffic data provided by the communication management module 73.

Figure 3:
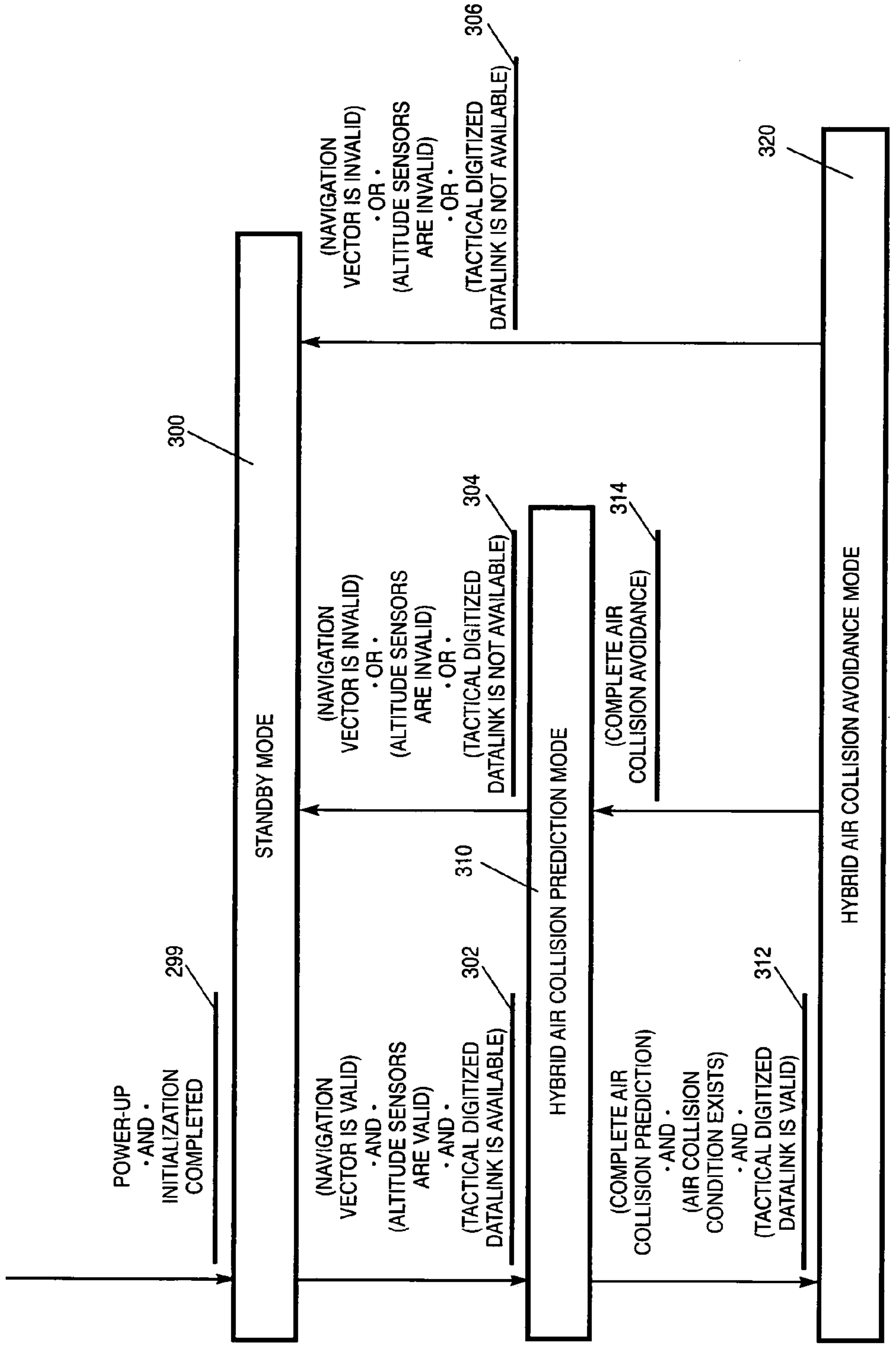
FIG. 3 is a mode transition diagram for three modes of the Hybrid Air Collision Avoidance System in accordance with the present invention.

Referring to FIG. 3, there is shown a state transition diagram providing necessary logic to allow a mode transition to take place. The three system modes of HACAS 69 are: standby mode 300, hybrid air collision prediction mode 310, and hybrid air collision avoidance mode 320. At system power-up, after completing system power-up test and initialization 299, HACAS 69 is placed in standby mode 300. From standby mode 300, if the data in navigation vector is valid, the altitude sensors are valid, and tactical digitized datalink is available 302, the module will make a transition to hybrid air collision prediction mode 310. Also from hybrid ground collision prediction mode 310, the module will make a transition back to standby mode 300, if either the navigation vector is invalid, or the altitude sensors are invalid, or tactical digitized datalink is not available 304. From hybrid air collision avoidance mode 320, the module will make a transition back to hybrid air collision prediction mode 310, if the air collision avoidance flag is set to true 314. From hybrid air collision prediction mode 310, the module will make a transition to hybrid air collision avoidance mode 320, if air collision prediction is complete, and air collision condition exists, and tactical digitized datalink is valid 312. From hybrid air collision avoidance mode 320, the module will make a transition to standby mode 300 if either the navigation vector is invalid, or altitude sensors are invalid, or tactical digitized datalink is not available 306.

Figure 4:
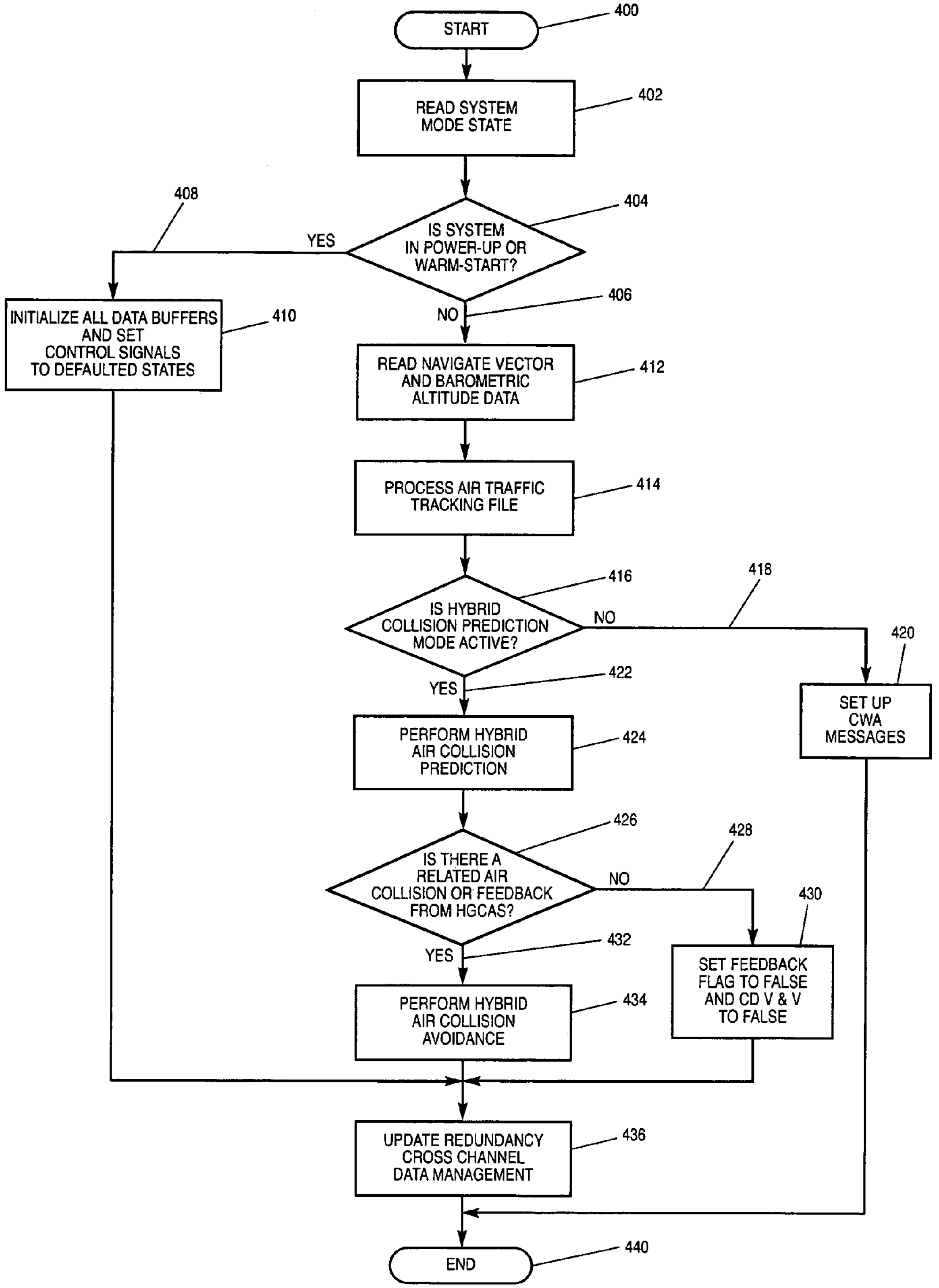
FIG. 4 is a logical flow diagram showing system behaviors of the Hybrid Air Collision Avoidance system in accordance with the present invention.

Referring to FIG. 4, there is shown a flow diagram outlining system behaviors of the HACAS 69. The initial step is start 400. The module reads system mode state 402. A test is then performed to determine if the module is in power-up or warm start 404. If the answer is affirmative 408, the module performs data initialization and sets control signals to defaulted states 410. Otherwise, the module will proceed with step 406 to read navigation vector and barometric altitude data 412. The module will then update the air traffic tracking file 414. A test is made to determine if hybrid collision prediction mode is active 416. If hybrid collision prediction mode is not active 418, the module will set up caution, warning and advisory messages 420. If an affirmative determination 422 is made, then the module will perform hybrid air collision prediction 424. A test is made to determine if there is a related air collision condition or a feedback from HGCAS 426. If there is no affirmative determination 428 for this test, then the module will set the feedback flag to false and cross-domain (CD) verification and validation to false 430. If there is an affirmative determination 432 for this test, then the module will perform hybrid air collision avoidance 434. After processing step 434, the module will update redundancy cross channel data management 436 and then go to the end of process 440 waiting for a next processing cycle to repeat the entire process from step 400.

Figure 5:
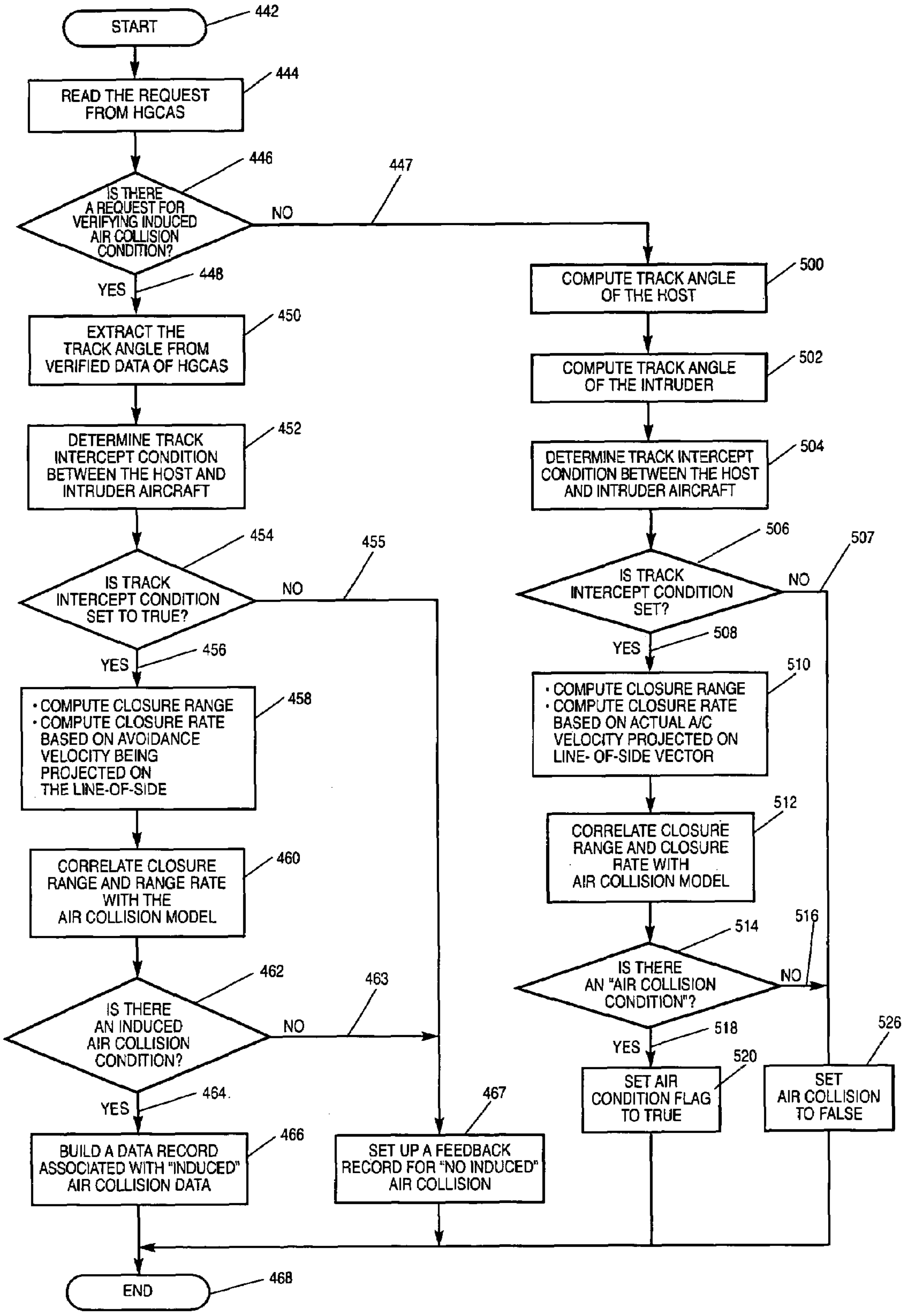
FIG. 5 is a logical flow diagram showing the process of determination for an air collision condition and an induced air collision condition as a feedback to the Hybrid Ground Collision Avoidance module in accordance with the present invention.

Referring to FIG. 5, there is shown a flow diagram outlining the process steps of hybrid ground collision predictor 218. The initial step is start 442. The module reads the request from the HGCAS 444. A test is performed to determine if there is a request for verifying induced air collision condition 446. If there is an affirmative answer 448, the module will extract the track angle from verified data HGCAS 450. The module will then determine a track intercept condition between the host aircraft and intruder aircraft 452. A test is made to determine if track intercept condition is set to true 454. If there is no affirmative determination 455 for this test, the module will set up a feedback record for "no induced" air collision 467. If an affirmative determination 456 is made, then the module will compute closure rate, based on avoidance velocity being projected on the instantaneous line-of-sight from the host to intruder aircraft, and closure range in terms of inertial distance and time 458. With the computed closure range and closure rate, the module will correlate this data with the air collision model 460. A test is made to determine if there is an induced air collision condition 462 resulting from the model-base data in step 460. If there is no affirmative determination 463 for this test, the module will proceed with the process in 467. If an affirmative determination 464 is made, then the module will build a data record to provide the data of induced air collision condition data 466 and then terminate this process at step 468. From the test in step 446, if there is no affirmative determination 447, the module will compute the track angle for the host 500. In step 502, the module extracts the intruder data to compute the track angle of the intruder aircraft. The module will resolve the reference to determine the track intersection condition between the host and intruder aircraft 504. A test is made to check the intercept condition 506. If there is no affirmative determination 507 for this test, the module will set the flag for air collision condition to false 526. If an affirmative determination 508 is made, then the module will compute closure rate based on actual air speed being projected on the instantaneous line-of-sight from the host to intruder aircraft, and closure range in terms of inertial distance and time 510. The module will correlate the computed range and closure rate data with the air collision model 512. A test is performed to determine if there is an air collision condition based on the results of the model-base correlation 514. If there is no affirmative determination 516 for this test, the module will set the flag for air collision condition to false 526. If there is an affirmative determination 518, the module will set the flag for air collision condition to true 520.

Figure 6:
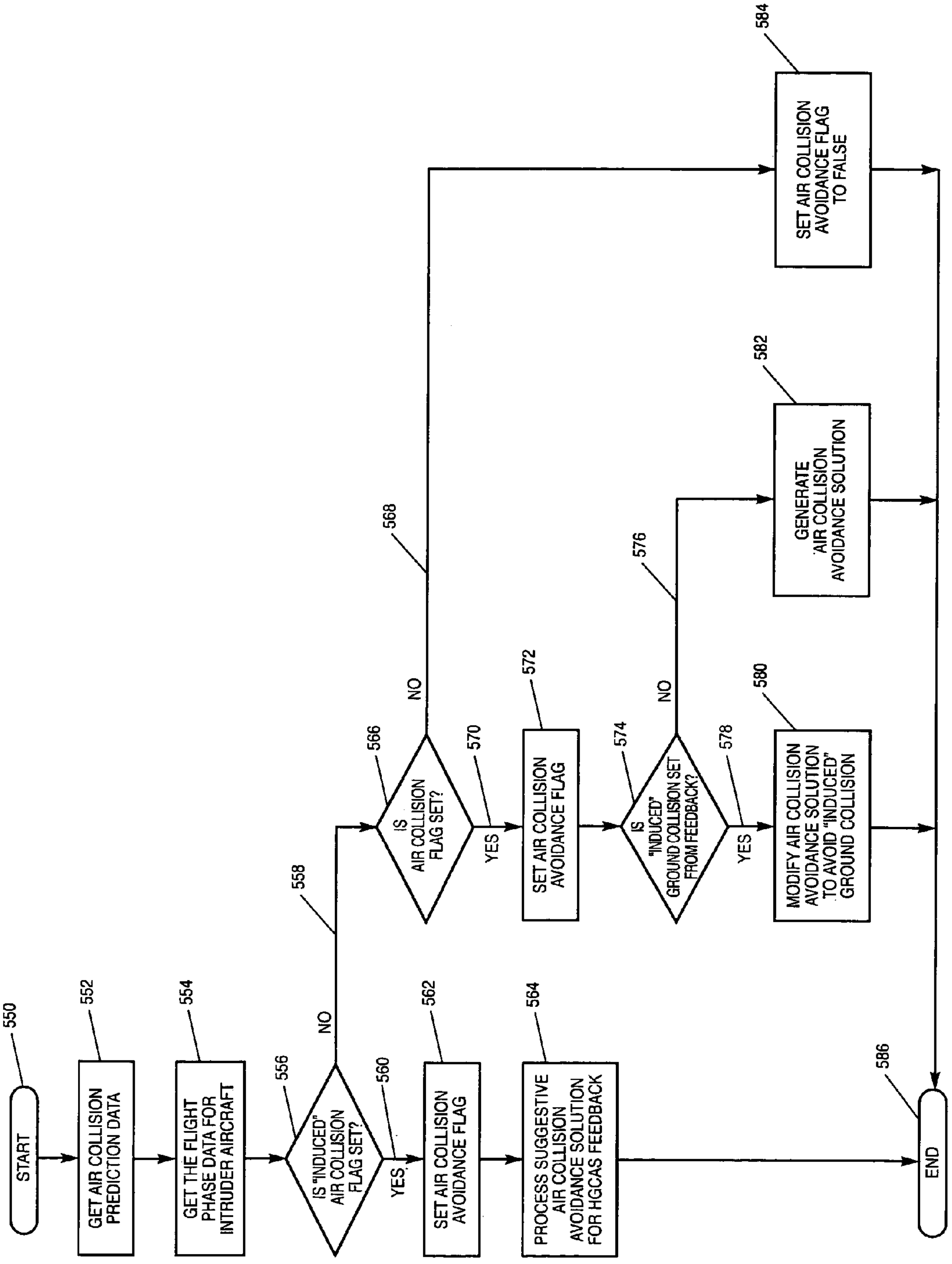
FIG. 6 is a logical flow diagram showing the computations of a hybrid air collision avoidance process for providing air domain feedback, modification to the air collision avoidance solution to remove an induced ground collision situation, and generation of air collision an avoidance solution in accordance with the present invention.

Referring to FIG. 6, there is shown a flow diagram outlining the preferred hybrid air collision avoidance process. The initial step is start 550. The module reads the data produced by hybrid air collision predictor 552. The next step is for the module to get the flight phase data for an intruder aircraft 554. A test is made to determine if induced air collision flag is set to true 556. If an induced air collision condition does exist 560, the module sets air collision avoidance flag to true 562. The module will then process suggestive air collision avoidance solution for HGCAS feedback 564. If there is no affirmative determination 558 for the test in 556, the module will perform another test to determine if air collision flag is set to true 566. If an affirmative determination 570 is made, then the module will set air collision avoidance flag to true 572. Otherwise, if there is no affirmative determination for the test 468, the module will set air collision avoidance flag to false 584. A test is made to determine if there is an induced ground collision condition in the feedback data 574. If an affirmative determination 578 is made, the module initiates a process of modifying the air avoidance resolution to remove induced ground collision condition 580. If there is no affirmative determination for the test 576, the module will generate an air collision avoidance resolution 582. The module completes the execution for this process at the end 586.

Figure 7:
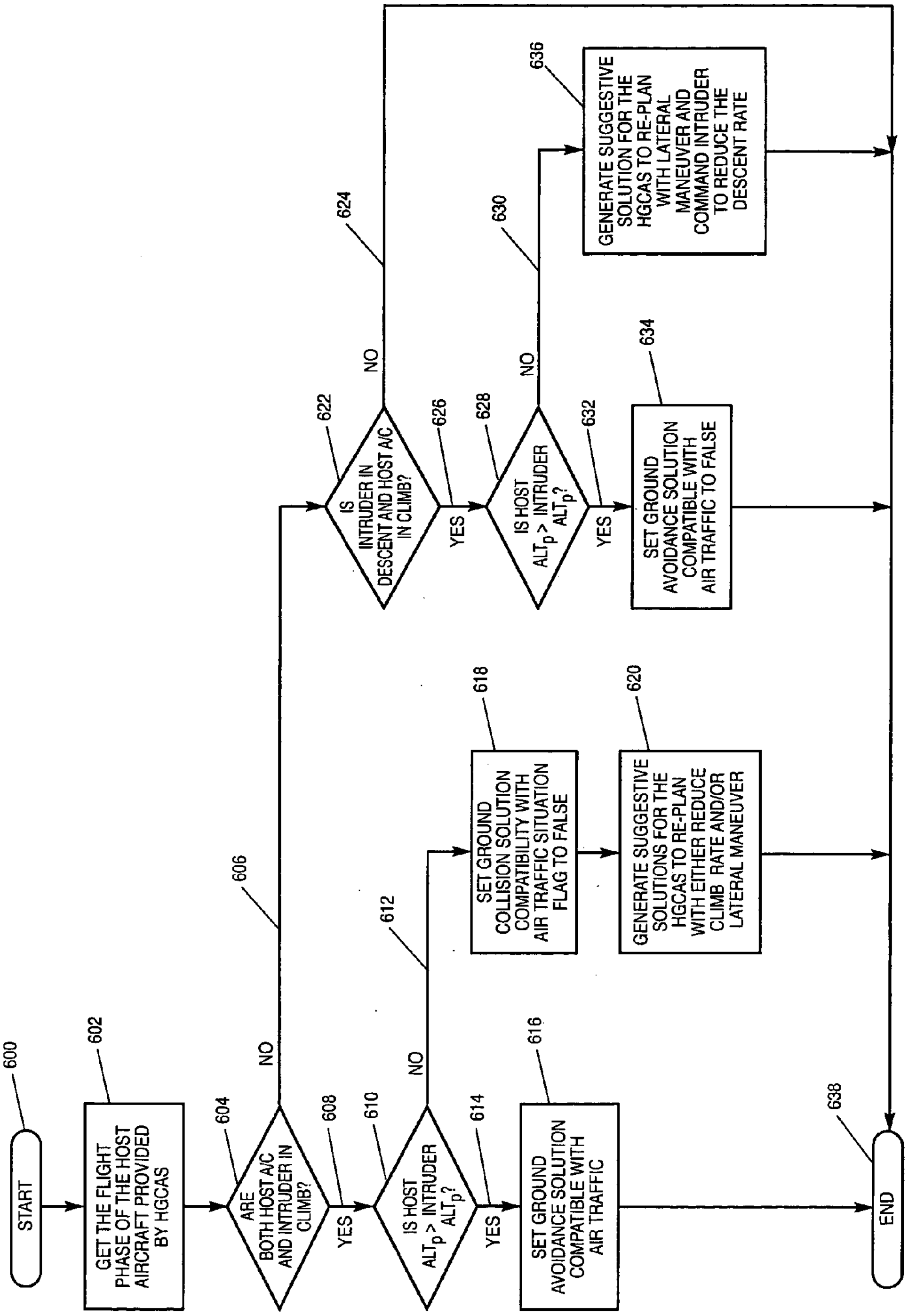
FIG. 7 is a logical flow diagram showing the process for determining compatibility with an air traffic situation for a ground avoidance solution and generating suggestive modifications to a ground collision avoidance solution in accordance with the present invention.

Referring to FIG. 7, there is shown a flow diagram outlining the process of determining the compatibility for a ground collision avoidance solution with air traffic and generating suggestive modification to the solution if necessary for feedback to the HGCAS. The initial step is start 600. The module reads the flight phase of the host aircraft provided by the HGCAS 602. A test is performed to determine if both the host aircraft and the intruder aircraft are in climb 604. If an affirmative determination is made 608, the module will perform another test for the barometric altitude 610. If the barometric altitude of the host aircraft is greater than that of the intruder aircraft 614, then the module will set the compatibility flag for the ground avoidance solution to true 616 and then terminate at the end step 638. Otherwise, if the barometric altitude of the intruder aircraft is above the host aircraft 612, then the module will set the compatibility flag to false for the ground collision avoidance solution 618. The next step 620, the module will generate suggestive solution for the HGCAS to re-plan with either reducing climb rate or combined with performing lateral maneuver. If both host and intruder aircraft are not in climb phase 606, the module performs another test to determine if the intruder aircraft is in descent and the host aircraft is in climb 622. If an affirmative determination can be made 626, the module continues with another test for barometric altitude 628. If the barometric altitude of the host aircraft is greater than that of the intruder aircraft 632, the module will set the compatibility flag for the ground collision avoidance solution to true 634. Otherwise, if the barometric altitude of the intruder aircraft is greater than that of the host aircraft 630, the module will generate suggestive solution for the HGCAS to re-plan with lateral maneuvering and commanding the intruder aircraft to reduce the descent rate 636. For the test in 622, if there is no affirmative determination 624, the module will proceed to the end of the process 638.

Figure 8:
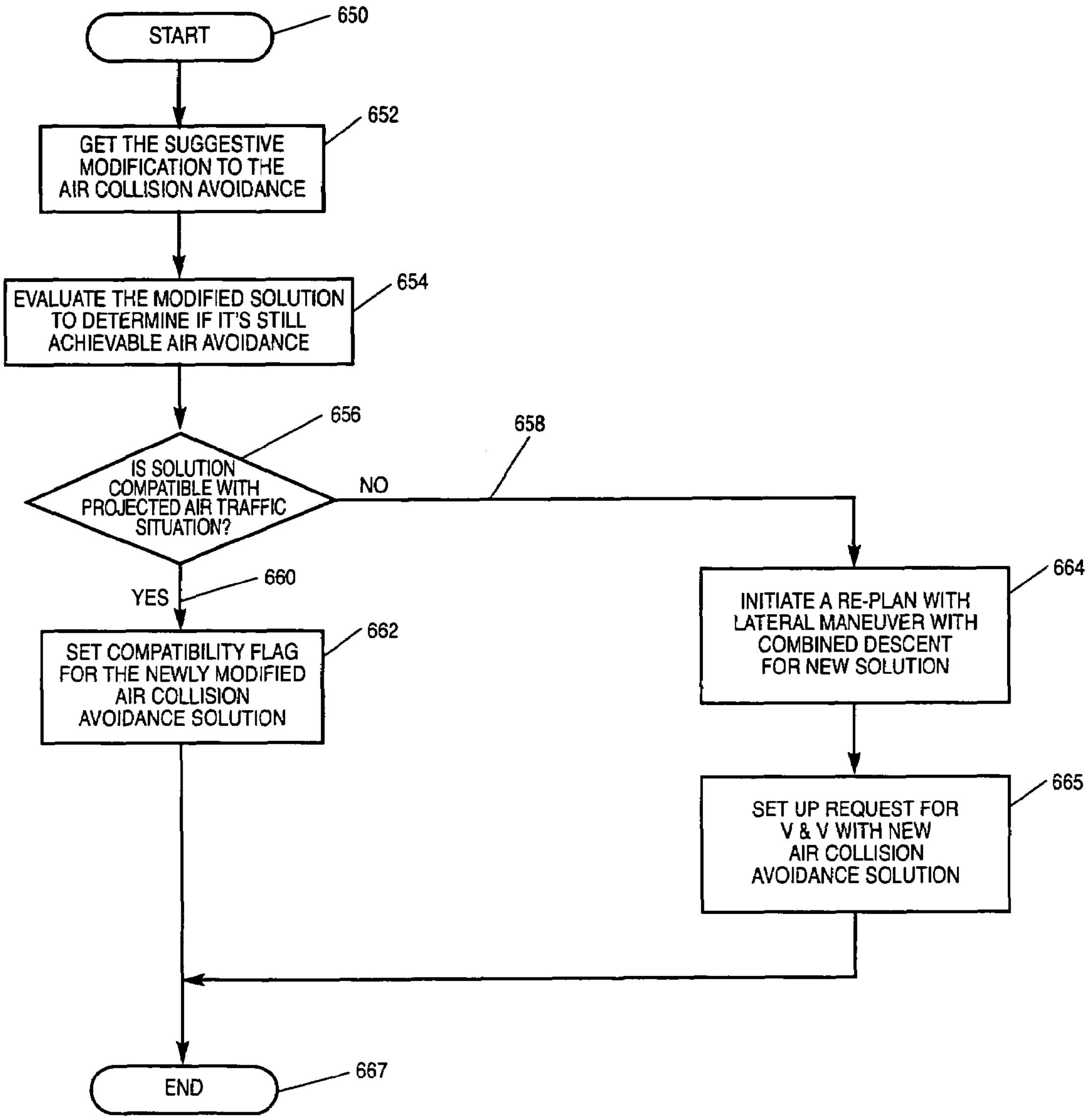
FIG. 8 is a logical flow diagram showing the computation process for modifying an air collision avoidance solution based on feedback data from a HGCAS and initiating new solution re-planning in accordance with the present invention.

Referring to FIG. 8, there is shown a flow diagram outlining the process of evaluating the suggestive modification of the air traffic collision avoidance resolution. The initial step is start 650. The module reads the suggestive modifications to the air traffic collision avoidance resolution 652 generated by the HGCAS. The module evaluates the modified resolution as a part of resolution validation for achievable air avoidance situation 654. A test is made to determine the result of the validation process 656. If the validation flag is set to true 660, the module will apply the modified resolution to the validated air traffic avoidance resolution 662 and then end the process at step 667. If the validation flag is set to false 658, the module will initiate a re-plan with lateral maneuver and combined with descent for a revised resolution 664. The module will then set up a request for verification and validation for the new resolution with the HGCA 665.

Figure 9:
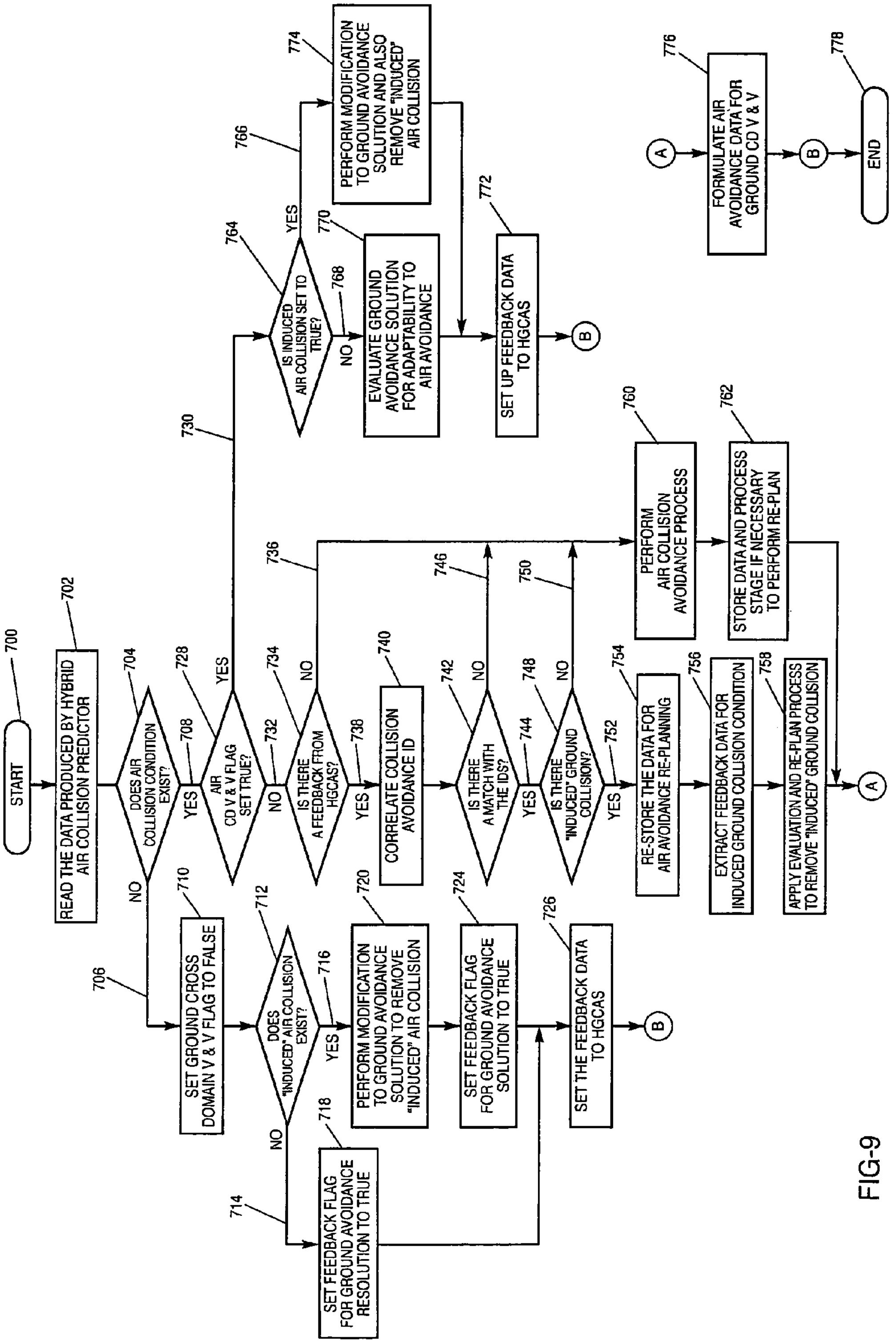
FIG. 9 is a logical flow diagram showing the computation process for providing feedback data to the HGCAS and organizing the air collision avoidance solution data to enable the HGACS to perform cross-domain verification and validation in accordance with the present invention.

Referring to FIG. 9, there is shown a flow diagram outlining the preferred hybrid air collision avoidance process. The initial step is start 700. The module reads the data produced by hybrid air collision predictor 702. A test is made to determine if an air collision condition exists 704. If an air collision condition doesn't exist 706, the module sets the cross-domain ground verification and validation flag to false 710. A test is made to determine if an induced air collision condition exists 712. If an induced air collision condition does not exist 714, the module sets the feedback flag for ground avoidance solution to true 718. If an affirmative determination 716 is made, the module initiates a process of modifying the ground avoidance resolution to remove induced air collision condition 720. In step 724, the module sets feedback flag for ground avoidance resolution to true. After completing either step 718 or step 724, the module sets up the feedback data to send to HGCAS 726. The end of this step is connected to node B. Returning to test 704, if an affirmative determination 708 can be made, the module will perform another test 728 to determine if the cross-domain air verification and validation flag is set to true. If it is set to true 730, the module initiates another test to determine if the induced air collision flag is set true 764. If it is set to true 766, the module performs a modification to the ground avoidance solution in order to remove induced air collision 774. If the result from the test is negative 768, the module evaluates the ground avoidance resolution for adaptability to air avoidance 770. At the end of processing in either 770 or 774, the module sends the feedback data to HGCAS 772. The module makes a connection to node B. If the cross-domain ground verification and validation flag is not set to true 732, the module makes a test to determine if there is feedback data from HGCAS 734. If there is no feedback data from HGCAS 736, the module will then perform air collision avoidance process 760. The module stores data and process stages in the event that it is necessary to perform re-plan 762. The module then connects with node A. If an affirmative determination 738 can be made, the module will correlate collision avoidance identification 740. A test is made to determine if there is match for avoidance identification 742. If there is not a match 746, the module performs air collision avoidance process 760. If there is a match in collision identification 744, the module initiates another test to determine if there is an induced ground collision condition 748. If the test is negative 750, the module moves to step 760. If an affirmative determination 752 is made, the module re-stores the data for air avoidance re-planning 754. The next step for the module is to extract feedback data associated with induced ground collision condition 756. The module evaluates and re-plans if it's necessary in order to remove induced ground collision condition 758. The module connects to node A. From node A, the module formulates the air avoidance data for cross-domain ground verification and validation 776. The module completes the execution for this process at end 778.

Figure 10:
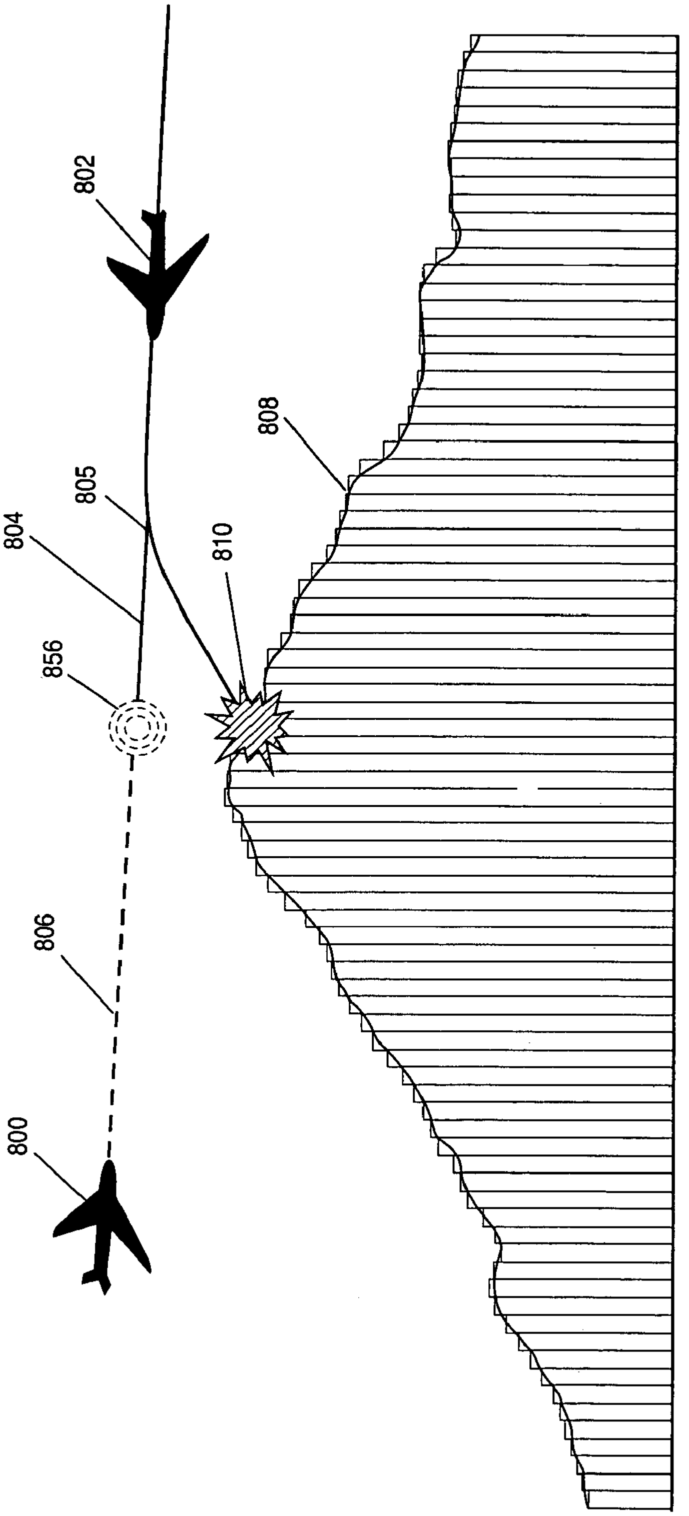
FIG. 10 is a graphical view of a vertical profile showing a potential occurrence of an induced ground collision condition due to performing an un-correlated air avoidance maneuver in accordance with the present invention.

Referring to FIG. 10, there is shown a graphical view of a vertical profile showing an induced ground collision condition due to the initiation of un-correlated maneuver that is intended to avoid a predicted air traffic collision condition. If the aircraft 802 continues on the flight path 804, the HACAS will predict an air collision condition 856 with the intruder aircraft 800 on flight path 806. The initial solution generated for the aircraft is to initiate a descent at 805. The HGCAS verifies the air avoidance solution for any ground domain conflicts and provides a feedback to indicate an induced ground collision situation at location 810 on the projected vertical profile 808. With the suggestive modification to the air collision resolution from the HGCAS, thee HACAS will either modify the maneuver of the air avoidance resolution or perform a re-plan to remove induced ground collision condition.

Figure 11:
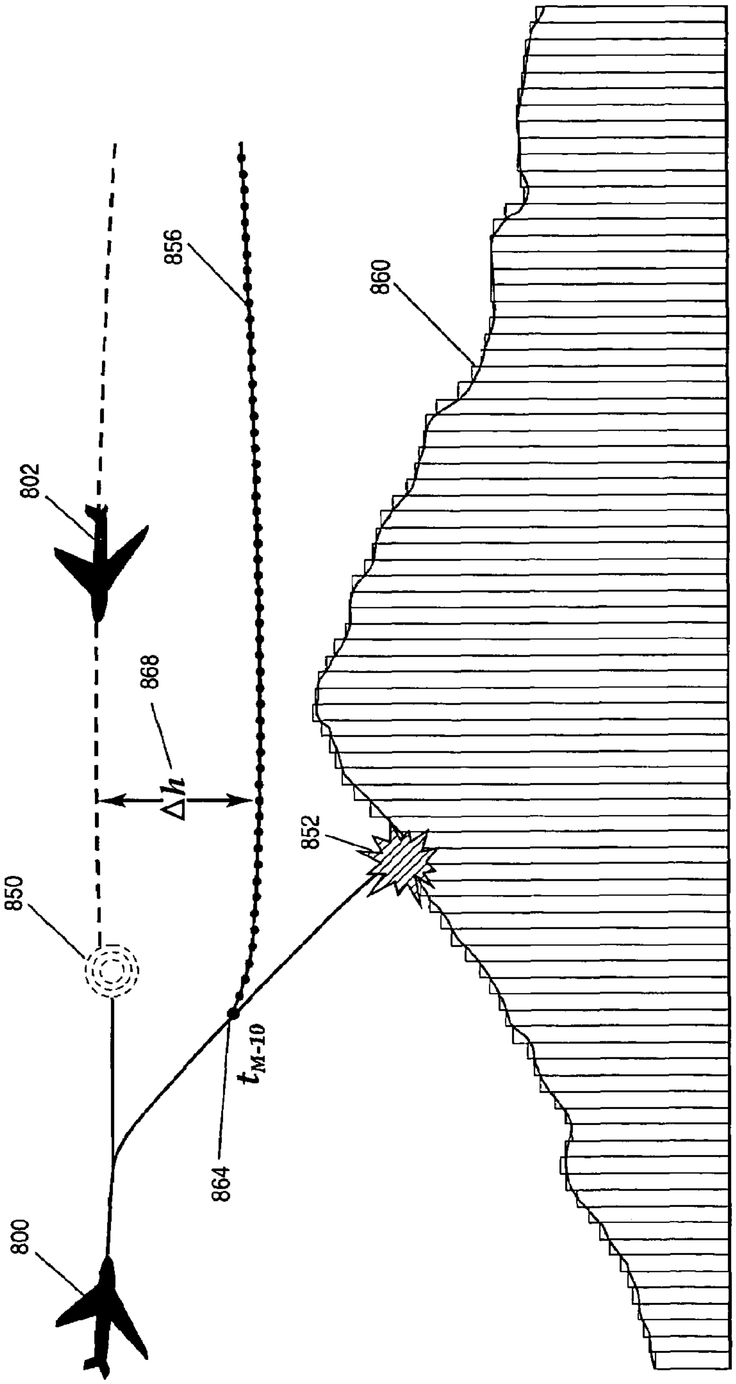
FIG. 11 is a graphical view of a vertical profile with fusing air collision avoidance maneuver with ground suggested maneuver modifications to remove an induced ground collision condition in accordance with the present invention.

Referring to FIG. 11, there is shown a graphical view of correlating an air avoidance profile with the local terrain. The initial solution provided by the HACAS for aircraft 800 to avoid midair collision situation at 850 is to initiate a descent. The HGCAS provides a feedback to indicate an induced ground collision condition would occur at 852 on the vertical profile 860 along with a suggestive modification to air traffic re-solution with an initiation of an altitude capture at time $t_{M-10}$ 864 on the predicted path 856. This will allow the HACAS to incorporate this suggestive modification and evaluate if the modified re-solution is still applicable with the air traffic situation. This provides a way to remove the induced ground condition and still have sufficient altitude separation 868 from intruder aircraft 802.

Figure 12:
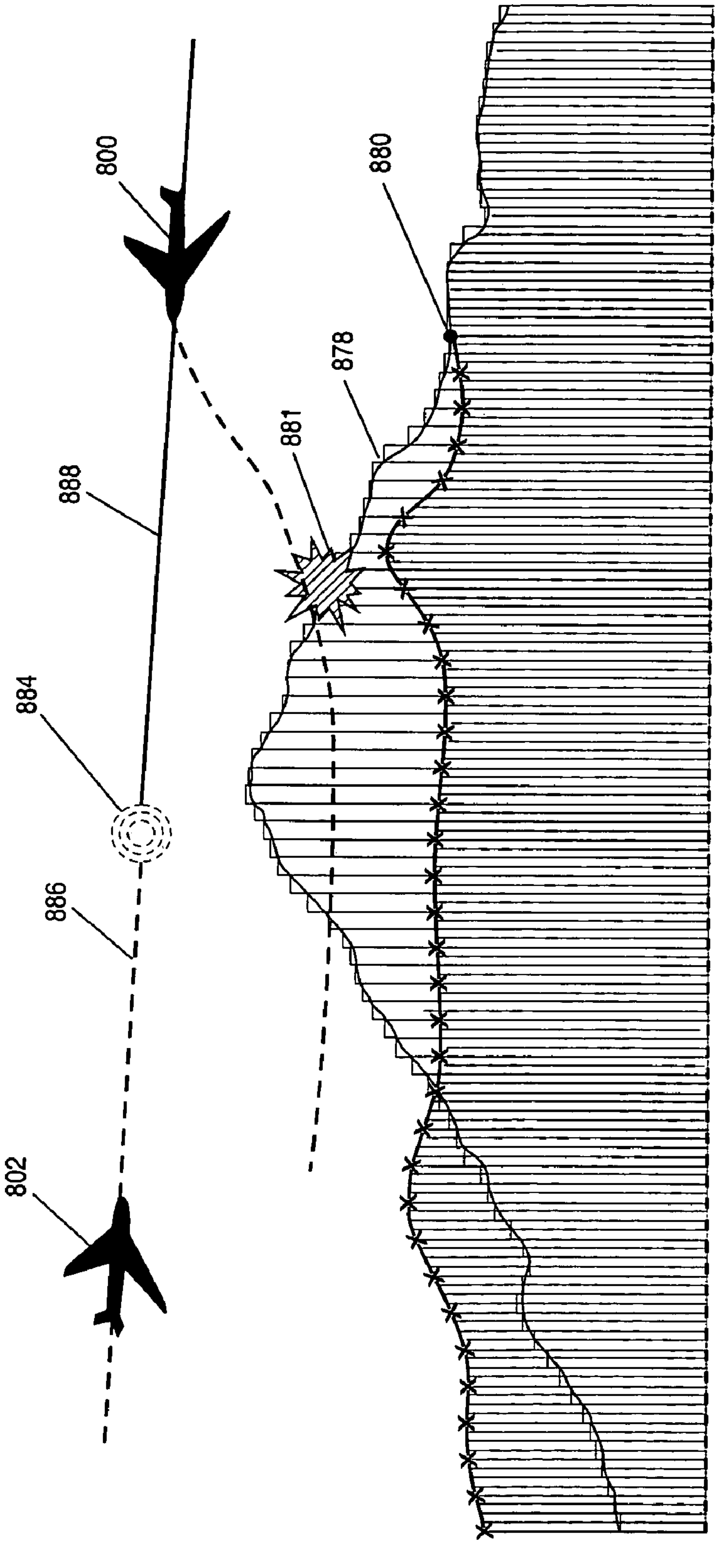
FIG. 12 is a graphical view of vertical and lateral profiles generated from an aircraft performing re-planning maneuvers, including lateral and vertical maneuvers to achieve an air collision avoidance situation and being free from an induced ground collision condition in accordance with the present invention.

Referring to FIG. 12, there is shown a graphical view of vertical profiles corresponded with re-planning to avoid air collision condition and induced ground collision situation. If aircraft 800 follows flight path 888, the HACAS predicts the aircraft on the collision course 884 with the intruder aircraft 802 on the flight path 886. With the initial solution, by initiating a descent, the aircraft 800 will face with problem of induced ground collision condition at 881 on the vertical terrain profile 878. However, with the feedback data from the HGCAS, the HACAS will be able to modify the resolution with suggestive maneuvers by combining descent with lateral maneuvering to get to an air space being away from air collision conflict and at the same time, the induced ground collision condition also is removed as shown on the vertical profile 880.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

The invention claimed is:

1. A method for providing a hybridized air collision avoidance solution for an aircraft, the method comprising the steps of:

a) determining whether an air collision condition exists;

b) generating an air avoidance solution based on the air collision condition;

c) providing the generated air avoidance solution to a ground collision avoidance system;

d) validating the generated air avoidance solution and generating an induced ground collision condition by the ground collision avoidance system;

e) feeding back the induced ground collision condition to the air collision avoidance system from the ground collision avoidance system with; and f) providing the hybridized air collision avoidance solution.

2. The method of claim 1 further comprising the step of continuously monitoring air collision conditions and ground collision conditions.

3. The method of claim 2 further comprising the step of repeating steps a) through f) for variations in the air collision conditions and the ground collision conditions.

4. The method of claim 1 wherein the step of determining comprises determining whether a predicted air collision condition and an induced air collision condition exists.

5. The method of claim 1 further comprising the step of re-planning the air avoidance solution if an induced ground collision condition exists.

6. The method of claim 5 further comprising the step of sending the re-planned air collision condition to provide a suggested modification to the ground collision avoidance system.

7. The method of claim 6 further comprising the step of validating the suggested modification by the ground collision avoidance system.

8. The method of claim 6 further comprising the step of modifying the generated air collision avoidance solution based on the suggested modification from the ground collision avoidance system.

9. The method of claim 1 wherein the generated air avoidance solution comprises solution supportive data.

10. An apparatus for providing a hybridized air collision avoidance solution for an aircraft, the method comprising the steps of:

a hybrid air collision predictor for determining whether an air collision condition exists and for generating an air avoidance solution based on the air collision condition;

a hybrid ground collision avoidance system for validating the generated air avoidance solution and generating an induced ground collision condition by the hybrid ground collision avoidance system;

a feedback loop for providing feedback from the ground collision avoidance system with the induced ground collision condition to the hybrid air collision avoidance system; and an output for providing the hybridized air collision avoidance solution.

11. The apparatus of claim 10 further comprising a monitor for continuously monitoring air collision conditions and ground collision conditions.

12. The apparatus of claim 11 further comprising an updated output for variations in the air collision conditions and the ground collision conditions.

13. The apparatus of claim 10 wherein the air collision condition comprises a predicted air collision condition and an induced air collision condition.

14. The apparatus of claim 10 further comprising a re-planner for re-planning the air avoidance solution if an induced ground collision condition exists.

15. The apparatus of claim 14 further comprising a transmitter for sending the re-planned air collision condition to the air collision avoidance system for providing a suggested modification to the ground collision avoidance system.

16. The apparatus of claim 15 further comprising a validator for validating the suggested modification by the ground collision avoidance system.

17. The apparatus of claim 10 wherein said hybrid air collision avoidance system comprises a generator for generating suggestive modification to the ground collision avoidance solution to remove an induced air collision condition.

* * * * *